United States Patent [19]

Davey

[11] 4,290,621
[45] Sep. 22, 1981

[54] BICYCLES

[76] Inventor: Joseph A. Davey, 250 Beach 134th St., Belle Harbor, N.Y. 11694

[21] Appl. No.: 142,853

[22] Filed: Apr. 21, 1980

Related U.S. Application Data

[63] Continuation-in-part of Ser. No. 961,718, Nov. 17, 1978, abandoned.

[51] Int. Cl.³ ............................................ B62M 19/00
[52] U.S. Cl. ...................................... 280/216; 418/200
[58] Field of Search ..................... 280/201, 216, 236; 60/486, 483, 428, 425, 413; 418/200; 180/218, 219, 305, 308

[56] References Cited

U.S. PATENT DOCUMENTS

| | | | |
|---|---|---|---|
| 485,094 | 10/1892 | Griswold | 280/216 |
| 2,177,381 | 10/1939 | Bichi | 60/413 |
| 2,337,499 | 12/1943 | Roth | 60/428 |
| 3,762,164 | 10/1973 | Bessette | 60/425 |
| 3,811,704 | 5/1974 | Gregoric | 280/216 |
| 3,850,448 | 11/1974 | Stewart | 280/216 |
| 4,078,816 | 3/1978 | Smith | 280/216 |

FOREIGN PATENT DOCUMENTS 537981 5/1955 Belgium .............................. 280/216

Primary Examiner—Joseph F. Peters, Jr.
Assistant Examiner—Randall A. Schrecengost
Attorney, Agent, or Firm—William P. Keegan

[57] ABSTRACT

A bicycle employing a hydraulic multi-speed drive mechanism in which the speed at which the bicycle is driven is determined by the volume of fluid pumped to a hydraulic motor connected to the rear wheel of the bicycle. Provisions are included to permit the rear wheel to be removed from the bicycle frame when required for servicing without the necessity of interrupting the hydraulic circuit leading to the motor.

7 Claims, 8 Drawing Figures

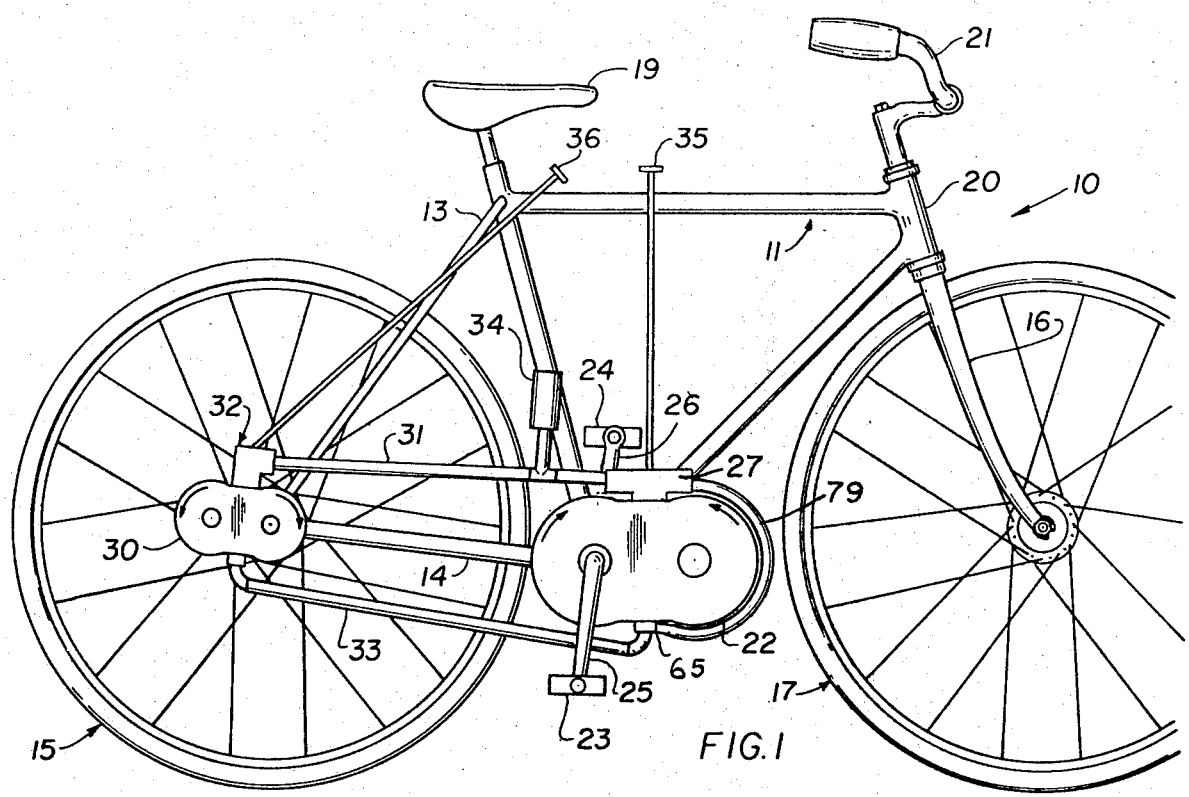
FIG.1
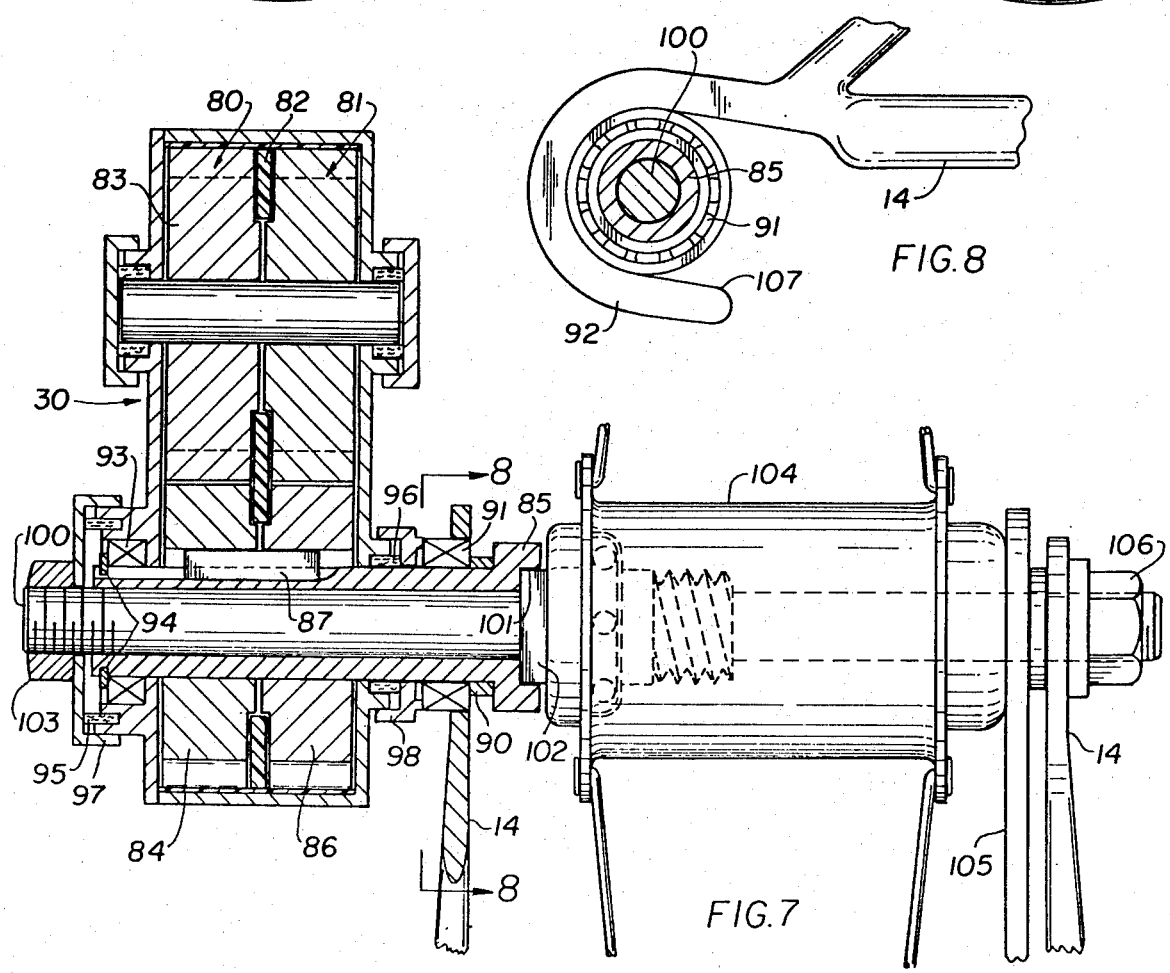
FIG.7
FIG.8

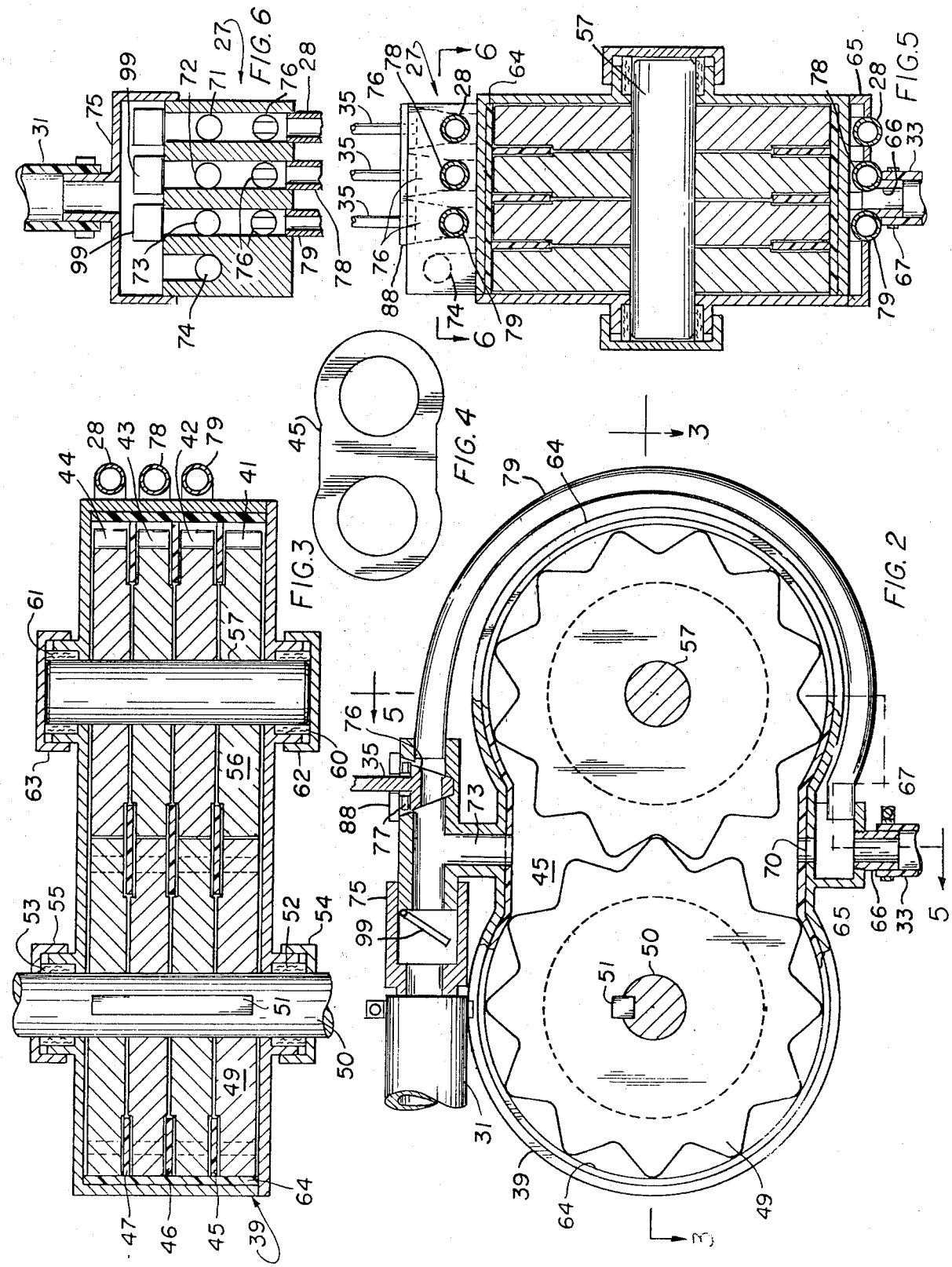

BICYCLES

FIELD OF THE INVENTION

This invention relates to bicycles, and more particularly to bicycles employing a hydraulic multi-speed drive mechanism. This application is a continuation in part of application Ser. No. 961,718 filed Nov. 17, 1978 and now abandoned.

BACKGROUND OF THE INVENTION

Bicycles conventionally utilize a chain drive to transmit power from the pedal actuated drive sprocket to a smaller driven sprocket fixedly attached to the hub of the rear wheel. Speed changing devices may be employed and these generally include, in a ten speed bicycle, a second drive sprocket having fewer sprocket teeth than the first drive sprocket, a multi-unit driven sprocket having five different size sprocket wheels connected to the hub of the rear wheel, and chain shifting mechanism that enables the drive chain to be shifted from one drive sprocket to the other and from one driven sprocket to another, thus giving ten speed combinations for a constant pedal rotation rate.

Bicycles employing hydraulic drive mechanisms have been proposed in the past, as in U.S. Pat. Nos. 485,094, 3,811,704, 3,850,448, and 4,078,816 and Belgian Pat. No. 537,981. In general, however, the mechanisms disclosed provided for a single speed transmission, or, as in U.S. Pat. No. 485,094, a single speed transmission capable of providing an incremental higher speed. None of the disclosures make any reference to the fact that it is often necessary to remove the hydraulically driven wheel for repair or other servicing, and hence no mechanism was disclosed that would facilitate removal of the wheel. More importantly, there is no disclosure that would permit removal of the wheel while preserving the integrity of the hydraulic circuit to the drive wheel motor.

BRIEF DESCRIPTION OF THE INVENTION

Accordingly, it is the object of the present invention to provide an improved hydraulic drive mechanism for a bicycle.

It is another object of the invention to provide a hydraulic drive mechanism which provides a wide speed change capability for a bicycle.

It is still another object of the invention to provide a bicycle hydraulic drive mechanism which permits removal of the driven wheel without breaking or interrupting the fluid connections of the drive mechanism.

It is yet another object of the invention to provide a bicycle hydraulic drive mechanism which is used in combination with a conventional coaster brake.

In carrying out the invention, there is provided a multi-chambered gear pump that is powered by the conventional pedal and crank arrangement. Each chamber, but one, is provided with a valved recirculation line so that as the pump is operated the fluid from each chamber, depending on whether or not the valve is open or closed, can be recirculated through the pump (when the valve is open) or directed to a hydraulic line leading to a multichambered hydraulic motor connected in driving arrangement with the rear wheel of the bicycle. Each chamber of the hydraulic motor, except one, is provided with a valved input that either admits fluid from the hydraulic line or closes that chamber of the motor to the fluid pumped through the hydraulic line. Since at least one chamber of the pump and one chamber of the motor are always in communication through the hydraulic lines joining the pump to the motor, actuation of the pedals will operated to drive or propel the bicycle. By selectively closing the valves on the pump and the hydrayulic motor, the rider can control the amount of fluid passing through the motor and hence the speed at which the bicycle is propelled. Once the bicycle is in motion, non-rotation of the pedals allows the bicycle to coast, and an initial reverse motion of the pedals will bring a coaster brake, if provided, into action to slow or stop the bicycle. Moreover, the hydraulic lines are flexible so that the drive wheel motor can be slipped off the hub mechanism without breaking the hydraulic circuit.

Features and advantages of the invention will be gained from the foregoing and from the detailed description of a preferred embodiment of the invention which follows.

BRIEF DESCRIPTION OF THE DRAWING

In the drawing:

FIG. 1 is a schematic illustration of a bicycle embodying the present invention;

FIG. 2 is a longitudinal view, partly in section, of the hydraulic pump unit;

FIG. 3 is a sectional view taken along line 3—3 of FIG. 2;

FIG. 4 is a front elevational view of a pump separator member;

FIG. 5 is a sectional view taken along line 5—5 of Fig. 2;

FIG. 6 is a sectional view taken along line 6—6 of FIG. 5;

FIG. 7 is a plan view, partly in section, showing the hydraulic motor attached to the drive wheel of the bicycle; and FIG. 8 is a view, partly in section, taken along line 8—8 of FIG. 7.

DETAILED DESCRIPTION OF THE INVENTION

Referring to FIG. 1 of the drawing, a bicycle 10 is illustrated as comprising a rigid frame 11 having a bifurcated rear wheel support including elements 13 and 14 which rotatably support the rear wheel 15. A fork member 16 having the front wheel 17 rotatably mounted thereon is pivotally supported in the head section 20 of frame 11. The usual handlebar 21 is provided for turning fork member 16 with respect to the bicycle frame to thereby steer the bicycle, and a rider's seat 19 is also provided. The bicycle thus far described is conventional and may include all the refinements that are known in the art and are provided for bicycles. The drive mechanism for bicycle 10 according to the present invention comprises a hydraulic pump unit 22 that is powered through the medium of a pair of pedals 23 and 24 mounted respectively on crank arms 25 and 26 which are connected to pump unit 22 and drive pump when rotated. The hydraulic fluid that is used in the system leaves the pump through valve unit 27 and is, in part, recirculated through recirculation lines 28 to the pump inlet and, in part, fed to the hydraulic motor 30 through a hydraulic hose 31 and motor valve unit 32. The fluid fed to motor 30 leaves the motor and is returned to pump unit 22 by way of hose 33. Motor 30 is connected to the rear wheel 15 of the bicycle as will hereinafter be described, but it may be noted here that hoses 31 and 33 are flexible so that motor can be disconnected from the rear wheel 15 without interrupting or breaking any fluid connection in the system when it is desired to remove the rear wheel from the frame 11 for servicing of the wheel or the tire. A drain plug (not shown) could be provided in the fluid path to permit drainage of fluid from the system if such is desired when servicing the hydraulic mechanism.

A pressure regulator 34 may be provided in the fluid circuit of the system. Valve operating members 35 and 36 enable a rider to control the flow of hydraulic fluid from pump unit 22 to motor 30 and thereby control the speed at which the bicycle is propelled for a constant rate of rotation of the pedals and cranks driving pump unit 22.

Attention is now directed to FIGS. 2, 3, 4, and 5 for a description of pump unit 22. Unit 22 comprises a housing 39 (which includes a removable cover plate 40 that permits access to the pump unit for servicing) in which four separate gear pumps 41, 42, 43, and 44 are provided in four pump chambers divided from each other by separator members 45, 46, and 47. The separate pump chambers need not be fluid tight and some leakage can take place between them without detriment. Since each pump is identical, only one will be described in detail. Pump 41 includes a driven gear 49 secured to axle 50 by key 51 and rotated by cranks 25 and 26. Oil seals 52 and 53 and oil caps 54 and 55 are provided to prevent fluid leakage where axle 50 exits from housing 39. Gear 49 drives idler gear 56 which is supported by stub shaft 57. Whether shaft 57 rotates or is stationary is immaterial. Oil seals 60 and 61 and oil caps 62 and 63 are provided to prevent fluid leakage where shaft 57 is supported in housing 39. The gears 49 and 56 are preferably of a light weight construction and may be made of a suitable plastic material or a metal gear rim secured to a light weight core which may be plastic, wood, or a lighter weight metal. A liner 64 may be provided to minimize friction and wear between the teeth of gears 49 and 56 and housing 39. The liner may be of a softer material than that of the teeth of gears 49 and 56 so that what wear does take place will be of the liner. If the wear results in a loss of pressure in the pump unit, the liner may be replaced with a new one to restore the desired operating characteristics of pump unit 22.

An inlet manifold 65 distributes fluid being recirculated through lines 28 and being returned to pump unit 22 through hose 33 to the individual gear pumps 41, 42, 43, and 44. Manifold 65 comprises a single chambered box fitted to housing 39. A connector 66 threaded into the manifold enables hose 33 to be secured to the manifold by a hose clamp 67. The recirculation lines 28, 78, and 79, which need not be flexible like hoses 31 and 33, may be formed of copper tubing and brazed or otherwise connected to inlets to manifold 65. Fluid entering the manifold passes through apertures provided in housing 39 and liner 64 to the various gear pumps. For example, aperture 70 is provided for fluid to enter gear pump 41. Similarly, apertures are provided in housing 39 and liner 64 to provide communication between the passageways in valve unit 27 and their associated gear pumps.

The valve unit 27 has four fluid passageways 71, 72, 73, and 74 for directing fluid from pumps 44, 43, 42, and 41, respectively, to manifold 75 and from it to hydraulic hose 31. Moreover, passageways 71, 72, and 73 lead also to recirculation lines 28, 78 and 79, but through plug cocks 76 which can be rotated independently of each other either to allow or prevent the fluid from pumps 44, 43, and 42 from being recirculated back to the pumps through the recirculation lines. A gasket member 77 and retainer plate 88 are provided to hold plug cocks 76 securely in their seats and prevent fluid leakage from unit 27. Control rods 35 are provided to facilitate opening and closing of plug cocks 76. Passageway 74, which is not provided with a plug cock nor a recirculation line, assures that when pump unit 22 is being operated by pedalling the bicycle, fluid will be delivered to motor 30 to propel the bicycle even though all plug cocks 76 are open to recirculate fluid through pumps 44, 43, and 42. Check valves 99 on passageways 71, 72, and 73 prevent fluid being pumped through passageway 74 from backflowing through recirculation lines 28, 78, and 79. Closing of the plug cocks successively delivers more and more fluid to motor 30, and, assuming a constant rate of operation of pump unit 22, i.e., a constant pedalling speed, a faster speed of propulsion of the bicycle.

Turning now to FIG. 7, the hydraulic motor 30 and its connection to rear wheel 15 will be described. Motor 30 is essentially a counterpart of pump unit 22 in that it comprises two motor units 80 and 81, each similar to a gear pump. A partition member 82 separates the two motor units into separate compartments. Hose 31 delivers fluid to valve unit 32 which includes a single plug cock (not shown) to control the flow of fluid to motor unit 81. Valve unit 32 also includes a non-restricted passageway that assures fluid being delivered to motor unit 80 whenever pump unit 22 is operated. Thus, when the plug cock is closed to restrict the flow of fluid to motor unit 81 and pump unit 22 is operating, fluid will flow only to unit 80 and the motor will operate at a speed depending on the quantity of fluid being delivered by pump unit 22 to hose 31. This, of course, depends on the number of plug cocks 76 which are closed in valve unit 27. The more plug cocks closed, the more fluid flows to motor unit 80 and the faster the bicycle is propelled. If the motor plug cock controlling the flow of fluid to motor unit 81 is opened so that the fluid will flow through motor unit 81 as well as through motor unit 80, the result is that more torque is delivered to driving wheel 15 of the bicycle and the bicycle is propelled at a slower speed than if all the fluid is delivered only to motor unit 80.

The connection from hydraulic motor 30 to wheel 15 is made by a drive sleeve member 85 which is keyed to rotors 84 and 86 by key member 87 so as to be rotated by the rotors when they are driven by the flow of fluid through motor 30. The motor-sleeve assembly comprises a spacer washer 90, bearing 91 (which as shown is placed between sleeve 85 and the slotted extension 92 of frame member 14), bearing 93, and a snap ring 94 fitted into a circumferential slot provided in sleeve 85 which effectively locks motor 30 to sleeve 85. Oil seals 95 and 96 and oil caps 97 and 98 assure that the assembly will not leak fluid from motor 30. The assembly is fitted over the extended stationary rear wheel axle 100 and the polygonally shaped socket 101 formed at the end of sleeve 85 engages a similarly shaped drive nut 102 on wheel 15. A nut 103, threaded onto axle 100, locks the motor 30 and the drive sleeve 85 into driving engagement with the rear wheel 15 of the bicycle.

Rear wheel 15, except for the extended axle 100 and the substitution of polygonal drive nut 102 for the usual rear wheel sprocket, is a conventional wheel embodying a coaster brake hub 104 and a brake arm 105, which, at its forward end, is clamped to frame member 14. Of course, the hydraulic drive mechanism of the present invention may be embodied in a bicycle employing hand brakes instead of a coaster brake.

To remove the rear wheel to, for example, service the coaster brake or facilitate the repair of a flat tire, nuts 103 and 106 would be loosened (and brake arm 105 disengaged from frame member 14) and wheel 15 and motor 30 pushed forward in the open ended slot 107 formed in frame extension 92 until free of the frame. Such movement is possible because of the flexibility of hydraulic hoses 31 and 33. Nut 103 is completely removed from axle 100 and motor 30 and sleeve 85 are slipped off axle 100. Wheel 15 is thus disconnected from the hydraulic drive mechanism without interrupting the fluid circuit of the system.

In operation, if it is assumed that all plug cocks 76 in valve unit 27 are open, rotation of the cranks 25 and 26 causes pump unit 22 to circulate fluid through passageway 74 and hose 31 to motor 30 where the unvlved passageway of valve unit 32 leads to motor unit 80. Thus, rotors 83 and 84 will be rotated to drive wheel 15 and propel the bicycle. The fluid in gear pumps 41, 42, and 43 will simply be recirculated to the pumps through lines 28, 78, and 79. To increase th speed at which the bicycle is propelled, the rider simply rotates a control rod 35 to close a second passageway to a recirculation line, e.g., 28, and thereby deliver more fluid to motor 30. Since more fluid is being pumped to motor unit 80, the rotors 83 and 84 will turn faster, thus increasing the speed of the bicycle. Alternatively, the rider could reduce the rate of pedalling so that the rate of fluid flow from two gear pumps would be equal to that from one gear pump being operated at a higher speed. Thus, the same bicycle speed could be obtained at a slower rate of pedalling. It is clear that the rate of pedalling and the speed of the bicycle can be controlled readily by opening and closing the plug cocks 76 of valve unit 27 and the single plug cock of unit 32. If the rider simply stops pedalling, the bicycle will coast in the usual fashion, but if the rider moves the pedals in the reverse direction so as to reverse the direction of fluid flow in the system, rotors 83 and 84 will reverse direction and drive sleeve 85 will immediately turn nut 102 in a reverse direction to apply the coaster brake and thus slow or stop the bicycle.

Having thus described the invention, it is clear that many apparently different embodiments or modifications can be conceived that would not depart from the spirit or scope of the invention. For example, a three-way valve having a single control rod could be employed instead of the plug cock valve unit 27 described. Other pumps, such as internal gear pumps, lobe pumps, or vane pumps could be used instead of the gear pumps described. Therefore, the foregoing description and the accompanying drawing are to be interpreted in an illustrative sense rather than in a limiting sense.

What is claimed is:

1. In a bicycle having a frame with bifurcated members for supporting a drive wheel, a pair of rotatably supported pedal means for applying manual power to propel the bicycle, a drive wheel rotatably supported on said frame, said wheel including an axle member and a wheel rotating element, and a drive mechanism connected to said pedal means and to said wheel for rotating said wheel when manual power is applied to said pedal means to propel the bicycle, an improved drive mechanism comprising: pump means actuated by said pedal means; hydraulic motor means including a drive member adapted to engage said wheel rotating element, said motor means being supported on said axle member outwardly of the bifurcated frame members; means for detachably securing said motor means on said axle member with said drive member in engagement with said wheel rotating element; flexible hydraulic hose means connecting said pump means to said motor means for transmitting hydraulic fluid from said pump means to said motor means and returning the fluid from said motor means to said pump means; valve means for controlling the quantity of hydraulic fluid transmitted to said motor means when said pedal means are rotated at a fixed rate; and manually operated means for actuating said valve means to vary the quantity of hydraulic fluid transmitted to said motor means, the arrangement being such that the motor means drive member can be disengaged from said drive element to permit removal of said motor means from said axle member and said wheel from said frame without interrupting the hydraulic connections between said pump means and said motor means.

2. A bicycle drive mechanism according to claim 1 wherein said pump means includes a plurality of pump units, and said valve means controls the flow of hydraulic fluid transmitted from all pump units but one.

3. A bicycle drive mechanism according to claim 1 wherein said motor means includes a plurality of motor units, and said valve means controls the flow of hydraulic fluid to all motor units but one.

4. A bicycle drive mechanism according to claim 1 wherein said pump means includes a plurality of pump units, said motor means includes a plurality of motor units, and said valve means controls the flow of hydraulic fluid transmitted from all pump units but one to all motor units but one.

5. A bicycle drive mechanism according to claim 4 wherein said valve means comprises a first valve mechanism for controlling the flow of hydraulic fluid transmitted from all pump units but one and a second valve mechanism for controlling the flow of hydraulic fluid to all motor units but one.

6. A bicycle drive mechanism according to claim 1 wherein said wheel includes a coaster brake mechanism, and wherein reverse rotation of said pedal means actuates said coaster brake mechanism.

7. A bicycle drive mechanism according to claim 2 wherein said pump means includes a housing, a pedal shaft rotatable by said pedal means, a plurality of separator plates for dividing said housing into a plurality of individual pump chambers, and wherein each pump unit comprises a gear pump keyed to said pedal shaft and each pump unit has a capacity substantially equal to that of the other pump units.

* * * * *